(12) United States Patent
Park

(10) Patent No.: US 6,231,029 B1
(45) Date of Patent: May 15, 2001

(54) SOLENOID VALVE FOR ANTI-LOCK BRAKE SYSTEM

(75) Inventor: Kyung-Ill Park, Pyungtak (KR)

(73) Assignee: Mando Machinery Corporation, Gunpo (KR)

( * ) Notice: Subject to any disclaimer, the term of this patent is extended or adjusted under 35 U.S.C. 154(b) by 0 days.

(21) Appl. No.: 09/435,742

(22) Filed: Nov. 8, 1999

(30) Foreign Application Priority Data

Nov. 13, 1998 (KR) .................................................. 98-48800
Nov. 17, 1998 (KR) .................................................. 98-22398

(51) Int. Cl.$^7$ .............................. F16K 47/00; F16K 31/02
(52) U.S. Cl. ................... 251/129.15; 251/120; 251/121; 138/44
(58) Field of Search ..................... 251/120, 121, 251/129.15; 138/44; 303/119.1, 119.2

(56) References Cited

U.S. PATENT DOCUMENTS

| | | | |
|---|---|---|---|
| 2,984,261 | * 5/1961 | Kates ..................... | 138/44 |
| 2,992,808 | * 7/1961 | Burritt Jr. et al. ..................... | 138/44 |
| 3,006,378 | * 10/1961 | Erickson et al. ..................... | 138/44 |
| 3,332,436 | * 7/1967 | Welty ..................... | 138/44 |
| 3,645,494 | * 2/1972 | Stelzer ..................... | 138/44 |
| 4,024,889 | * 5/1977 | Smith et al. ..................... | 138/44 |
| 4,383,552 | * 5/1983 | Baker ..................... | 138/44 |
| 4,384,592 | * 5/1983 | Ng ..................... | 138/44 |
| 4,546,796 | * 10/1985 | Bourquin ..................... | 138/44 |
| 4,887,637 | * 12/1989 | Ketner ..................... | 138/44 |
| 5,154,394 | * 10/1992 | DuHack ..................... | 138/44 |
| 5,647,644 | 7/1997 | Volz et al. . | |

\* cited by examiner

*Primary Examiner*—Kevin Shaver
*Assistant Examiner*—David A. Bonderer
(74) *Attorney, Agent, or Firm*—Ladas & Parry

(57) ABSTRACT

A solenoid valve for an anti-lock brake system is disclosed which has two orifices and oil passages formed a magnetic core so that at the slip mode the amount of hydraulic oil transmitted to a wheel sylinder can be varied, its structure is simplified and its manufacture is facilitated. The solenoid valve includes a magnetic core 130 inserted into a bore 101 in a modulator 100 which has an inlet and outlet passages 300 and 310 and an invariable orifice 320, a plunger 140 installed in the magnetic core 130, and a piston 200A installed in the inlet passage 300. The piston 200A has an eccentric hole 202 formed vertically passing through its interior and a groove 203 on its top surface, thus forming a variable orifice 340 along with a lower end of the invariable orifice 320. The magnetic core 130 has a through hole 330 formed slanting upward. A lip seal 400 is formed between the outer periphery of the magnetic core 130 and the bore 101.

12 Claims, 7 Drawing Sheets

SOLENOID VALVE FOR ANTI-LOCK BRAKE SYSTEM

BACKGROUND OF THE INVENTION

1. Field of the Invention

This invention relates to an anti-lock brake system, and more particularly, to a solenoid valve for an anti-lock brake system that can enhance a braking performance by variably controlling an amount of fluid to be supplied during a slip control.

2. Description of Related Art

Generally, a brake system comprises a wheel cylinder mounted on an automotive wheel to generate braking force using hydraulic pressure, a booster/master cylinder assembly for forming hydraulic pressure and applying the same to the wheel cylinder, and a modulator for controlling the hydraulic pressure to be supplied according to a running condition of a vehicle in accordance with signals transmitted from an electronic control unit.

The modulator is equipped with normal-open and normal-close solenoid valves for controlling the supply of braking pressure. The normal-open solenoid valve is designed to, in a normal brake mode, maintain an opened state to supply hydraulic pressure to the master cylinder without pressure reduction, and in a slip control mode, control an amount of the hydraulic oil to control the braking pressure.

The normal-open solenoid valve controls an amount of the hydraulic oil by a simple On/Off operation of a plunger. Accordingly, the flow rate of the hydraulic oil which can pass through the valve at the slip control mode is the same as at the normal brake mode.

Therefore, in such a conventional normal-open solenoid valve, an amount of the hydraulic pressure to be supplied cannot be precisely controlled, making it difficult to accurately perform a slip control. Furthermore, a water hammering phenomenon occurs by pulsations of fluid due to the plunger's movement to open and close positions, thereby generating noises and deteriorating the durability of parts.

To solve the above described problems, a normal-open solenoid valve which is designed to reduce an amount of the fluid to be supplied to the wheel cylinder in proportion to a slip rate, while alleviating the pulsations of the fluid during a slip control, has been developed.

As shown in FIG. 1, an example of such a normal-open solenoid valve is disclosed in the U.S. Pat. No. 5,647,644, which comprises a valve seat 23, a magnetic core 21, a plunger 22, and a piston 24, all of which are installed in a valve housing 20. The valve seat 23 is forcedly fitted in a lower portion of the valve housing 20 and provided with a longitudinal through hole. The plunger 22 is mounted passing through the magnetic core 21 such that a lower end thereof is disposed in the vicinity of the top of the valve seat 23. The piston 24 is disposed around the valve seat 23 and biased against the magnetic core 21 by a spring 25.

The normal-open solenoid valve is provided with two orifices, one of which is an invariable orifice formed on an upper end of the valve seat 23 and the other of which is a variable orifice 40 that is defined by a slot 26 formed on the top of the piston 24 when the piston 24 contacts the magnetic core 21 during a slip control.

In addition, a hydraulic channel branch 31 is defined between one side wall of the valve seat 23 and the valve housing 20 so that hydraulic pressure supplied through an inlet 27 can be applied to the piston 24 through the hydraulic channel branch 31, thereby displacing the piston 24 upward while overcoming the biasing force of the spring 25. A stepped portion 23a is formed on another lower side of the valve seat 23 so as to forcedly fit the valve seat 23 into the valve housing 20.

In the normal brake mode, the plunger 22 is urged upward while the piston 24 is biased downward by the spring 25. Therefore, hydraulic oil is supplied through the inlet 27, then directed to an outlet 28 through the invariable orifice 30.

In the slip control mode, the plunger 22 is displaced downward to close the invariable orifice 30. As a result, the hydraulic oil supplied through the inlet 27 is applied to the piston 24 through the hydraulic channel branch 31 so that the top of the piston 24 contacts the magnetic core 21 by being moved upward while overcoming the elastic force of the spring 25. After this, when the plunger 22 is moved upward, the hydraulic pressure generated by the master cylinder is directed to the wheel cylinder through the variable orifice 40 formed by the slot 26 of the piston 24 contacting the magnetic core 21.

When the braking force is released, the hydraulic oil within the wheel cylinder is returned to the master cylinder through the return passage 29 formed passing through the valve housing 20 to communicate the inlet 27 with the outlet 28. After this, the plunger 22 is moved upward so that the solenoid valve is returned to its open state.

However, in the above-described normal-open solenoid valve, since the lower portion of the valve seat is designed to have the stepped portion and the channel branch defining portion, and the channel branch defining portion should be precisely formed, it is difficult to manufacture the valve seat.

In addition, since the special valve housing for receiving the magnetic core, the valve seat, the piston and the fluid passages is required, the entire size of the solenoid vlave is increased.

SUMMARY OF THE INVENTION

Therefore, this invention has been made in an effort to solve the above described problems.

It is an object of this invention to provide a solenoid valve for an anti-lock brake system, which can vary an amount of hydraulic oil to be supplied during a slip control.

It is another object of this invention to provided a solenoid valve, which is simple in the structure and easy to be manufactured by forming oil passages and two orifices using a valve seat and a piston.

To achieve the above objectives, this invention provides a solenoid valve comprises a magnetic core, a plunger and a piston is mounted on the modulator of an anti-lock brake system.

The magnetic core is inserted into a bore provided to the modulator, and has a plunger hole formed extending from its upper end to its middle, an inlet passage provided to its lower end from its middle, an outlet passage provided at the lower end of the plunger hole, and an invariable orifice allowing the inlet passage to communicate with the outlet passage.

The piston is provided to the inlet passage in such a manner that it is movable up and down, and has an eccentric hole formed vertically passing through its interior, thus forming a variable orifice along with a lower end of the invariable orifice.

The inlet passage has a small-diameter portion and a large-diameter portion on its upper and lower areas, respectively, and the piston is of a diameter of a nearly same size as the small-diameter portion, and has a support jaw having a nearly same diameter as the large-diameter portion on its lower end.

As a first embodiment of this invention, the piston has a groove on its top surface to allow the eccentric hole to communicate with the invariable orifice.

As a second embodiment of this invention, a protruding jaw, in place of the groove, is provided to the lower end of the invariable orifice to allow the eccentric hole to communicate with the invariable orifice.

As a third embodiment of this invention, a recess, in place of the groove, is provided to the lower end of the invariable orifice to allow the eccentric hole to communicate with the invariable orifice.

The magnetic core has a through hole formed slanting upward to its one side from the large-diameter portion of the inlet passage.

A lip seal is formed between the outer periphery of the magnetic core and the bore of the modulator to prevent oil from flowing to the direction of the outlet passage.

BRIEF DESCRIPTION OF THE DRAWINGS

Further objects and other advantages of this invention will become apparent from the following description in conjunction with the attached drawings, in which.

DETAILED DESCRIPTION OF PREFERRED EMBODIMENT

Reference will now be made in detail to the preferred embodiments of this invention, examples of which are illustrated in the accompanying drawings.

Figure 1:
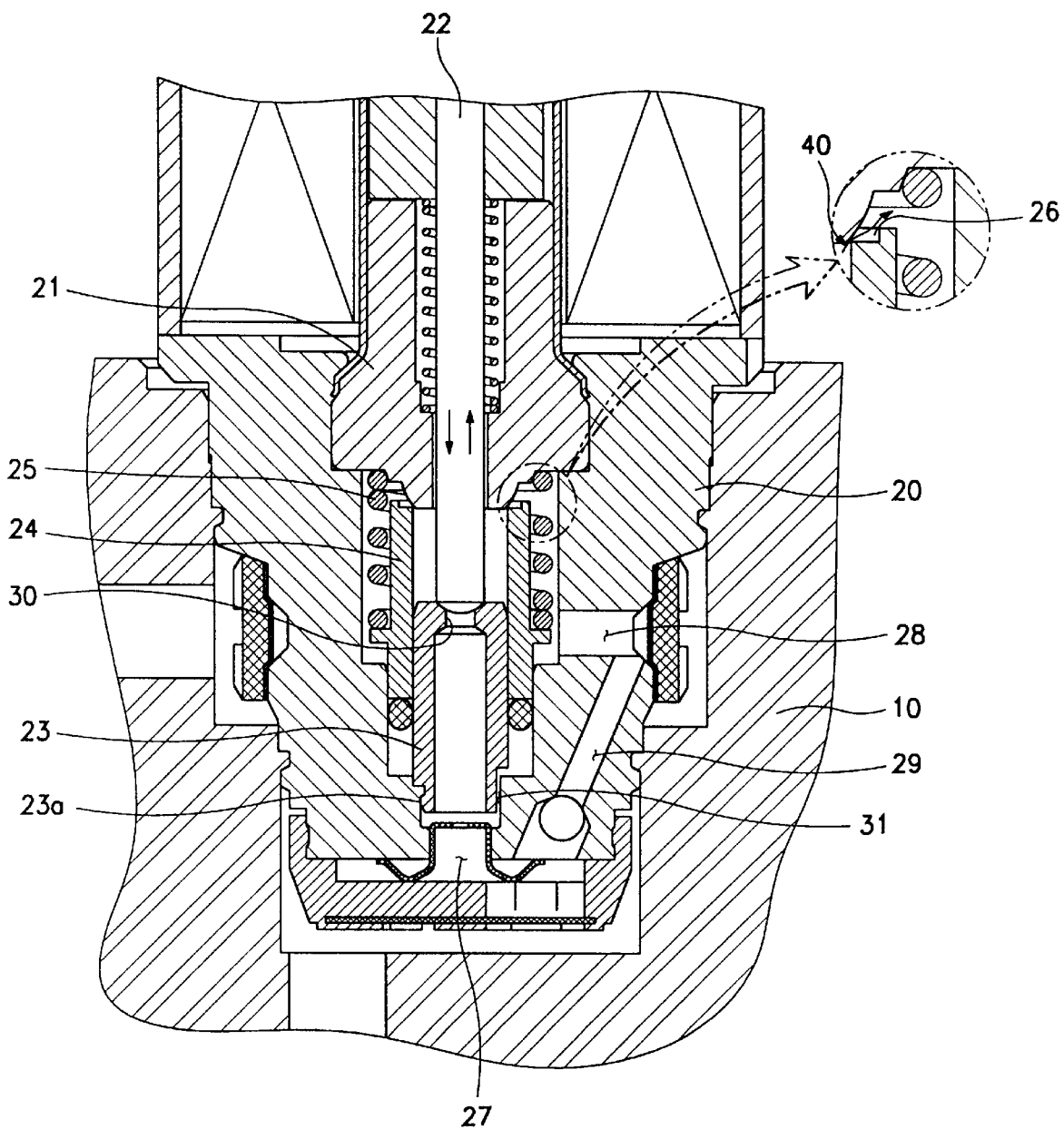
FIG. 1 is a longitudinal sectional view of a solenoid valve for a conventional anti-lock brake system.
Figure 2:
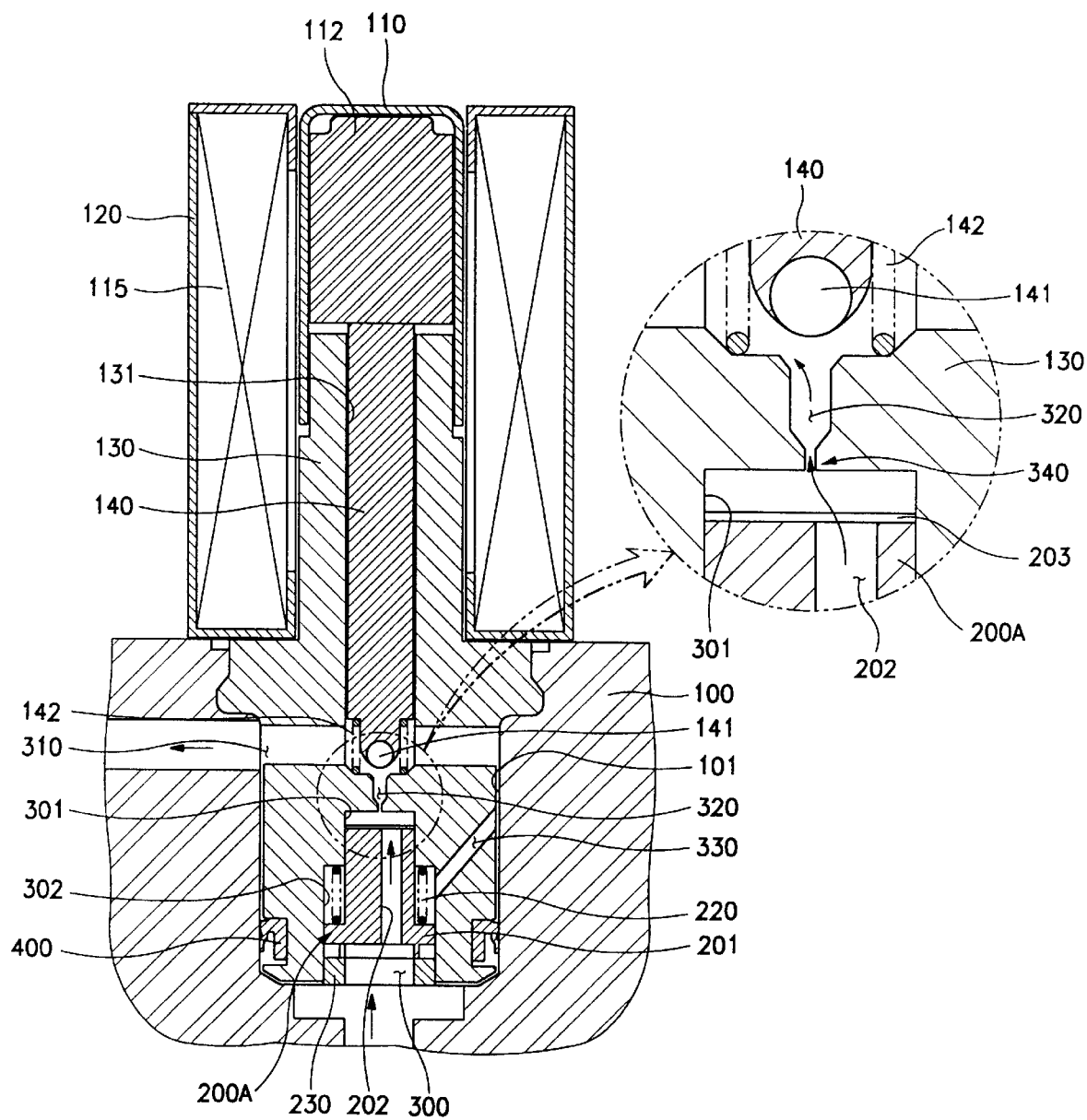
FIG. 2 is a longitudinal sectional view of a solenoid vlave for an anti-lock brake system according to this invention, which is in the opened state to perform a normal brake.
Figure 5:
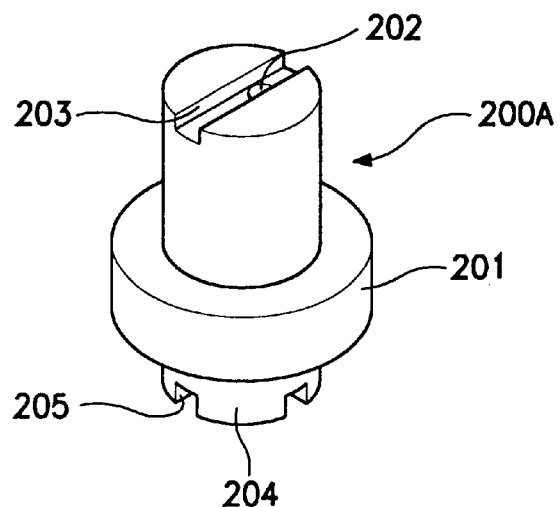
FIG. 5 is a perspective view of a piston according to a first embodiment of this invention.
Figure 6:
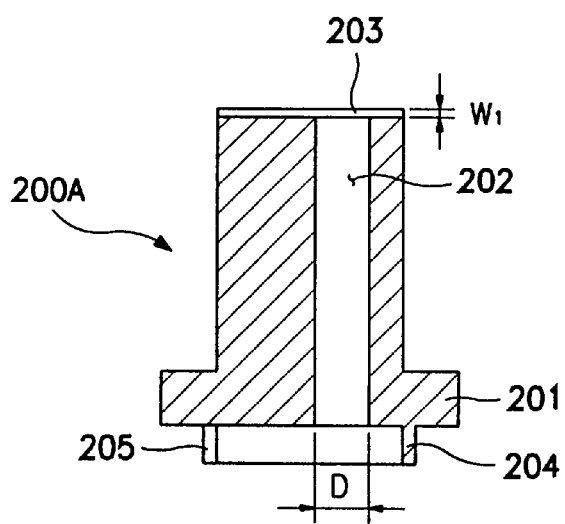
FIG. 6 is a longitudinal sectional view of the pistion in FIG. 5.

FIG. 2 depicts a solenoid valve kept open during the normal brake mode, and FIGS. 5 and 6 depict a piston in accordance with a first preferred embodiment of this invention.

As shown in FIG. 2, the normal-open solenoid valve includes a magnetic core 130, a plunger 140, and a piston 200A, which is installed on a modulator 100 by fixing the lower portion of the magnetic core 130 to a bore 101 formed on the modulator 100.

A sleeve 110, having an armature 112 inside, is attached to the magnetic core 130's upper portion, and a yoke 120, having a coil 115 inside, is attached to the magnetic core 130's upper circumferential surface protruding to the outside. The plunger 140 is attached to the armature 112's bottom, and the armature 112 is spaced a given distance away from the magnetic core 130 when the solenoid valve is being normally opened so as to let the plunger 140 be moved up and down.

The magnetic core 130 has a plunger hole 131 vertically formed in its inside upper portion to house the plunger 140 and an inlet passage 300 vertically formed in its inside lower portion to receive hydraulic oil from a master cylinder (not illustrated). The magnetic core 130 also has an outlet passage 310 provided to a lower end of the plunger hole 131 to discharge the hydraulic oil out to a wheel cylinder (not illustrated). An invariable orifice 320 is formed between the outlet passage 310 and the inlet passage 300 to connect them with one another. Since such passages are provided to the magnetic core 130, the inventive solenoid valve does not have to have the conventional valve body.

In the normal opened state of the valve, the plunger 140's upper end keeps contacting the armature 112 while its lower end is spaced a given distance away from the upper end of the invariable orifice 320.

A ball 141 is mounted on the plunger 140's bottom to shut the upper end of the invariable orifice 320 at the slip control mode, thus closing the valve, and a spring 142 is provided around the plunger 140's lower portion to urge the plunger 140 upward.

The piston 200A is installed in the inlet passage 300 in such a manner that it is movable up and down. The inlet passage 300's upper area forms a small-diameter portion 301, and its lower area forms a large-diameter portion 302. The piston 200A's diameter is substantially same as the small-diameter portion 301's diameter. A support jaw 201 is formed on the piston 200 A's lower end, the diameter of which is substantially same as the large-diameter portion 302's. An eccentric hole 202 is formed in the piston 200A to be slightly out of its middle, vertically passing the piston 200A through. A spring 220 is installed between the upper end of the large-diameter portion 302 and the support jaw 201 to urge the piston 200A downward.

As shown in FIG. 5, the piston 200A has a groove 203 transversely formed on its top surface to be connected with the eccentric hole 202, and an extending part 204 provided to the support jaw 201's lower end and having a diameter smaller than the support jaw 201's and a plurality of slots 205 on its side surface. Because the invariable orifice 320's lower portion has a small sectional area, when the piston 200A is moved up to contact the invariable orifice 320's lower end during the slip control mode, the connection of the oil passages may not be formed well. However, at this time, the oil that has passed the eccentric hole 202 is introduced to the invariable orifice 320 through the groove 203, thus assuring smooth flow. As shown in FIG. 6, it is preferable that the groove 203's width W1 is formed to be smaller than the eccentric hole 202's diameter D. A ring-shaped stopper 230 is provided to the inlet passage 300's lower end to limit the downward movement of the piston 200A(FIG. 2).

A through hole 330 is formed on one side of the magnetic core 130 to be slant upward from the large-diameter portion 302 of the inlet passage 300. This through hole 330 makes a difference of pressure, generated between the inlet passage 300 and the outlet passage 310 when the plunger 140 shuts the invariable orifice 320 at the slip control mode, act on the piston 200A, thereby moving the piston 200A upward. For this purpose, as depicted in FIG. 2, a minute gap is formed between the magnetic core 130 and the modulator 100's bore 101, so that the oil can flow through this gap. A lip seal 400 is also provided between the magnetic core 130's outer periphery and the modulator 100's bore 101 to prevent the oil from flowing to the direction of the outlet passage 310. The oil can flow to the inlet passage 300 from the outlet passage 310 through the gap between the magnetic core 130 and the bore 101 by this lip seal 400, but the oil's flow to the outlet passage 310 from the inlet passage 300 is restricted.

The following description relates to the operation of the normal-open solenoid valve of such a structure.

FIG. 2 depicts the solenoid valve kept in the normal open state. In this state, the plunger 140 and the armature 112 are placed on the sleeve 110's upper end, and the ball 141 attached to the plunger 140's bottom keeps the invariable orifice 320 open. The piston 200A is positioned the lower portion of the inlet passage 300 by the spring 220's elastic force, and a variable orifice 340, formed by the invariable orifice 320 and the piston 200A, is kept open. Therefore, the inlet passage 330 and the outlet passage 310 are being completely opened so the hydraulic oil generated from the master cylinder is transmitted to the wheel cylinder through the inlet passage 300 and the outlet passage 310 to exert a brake force normally.

Figure 3:
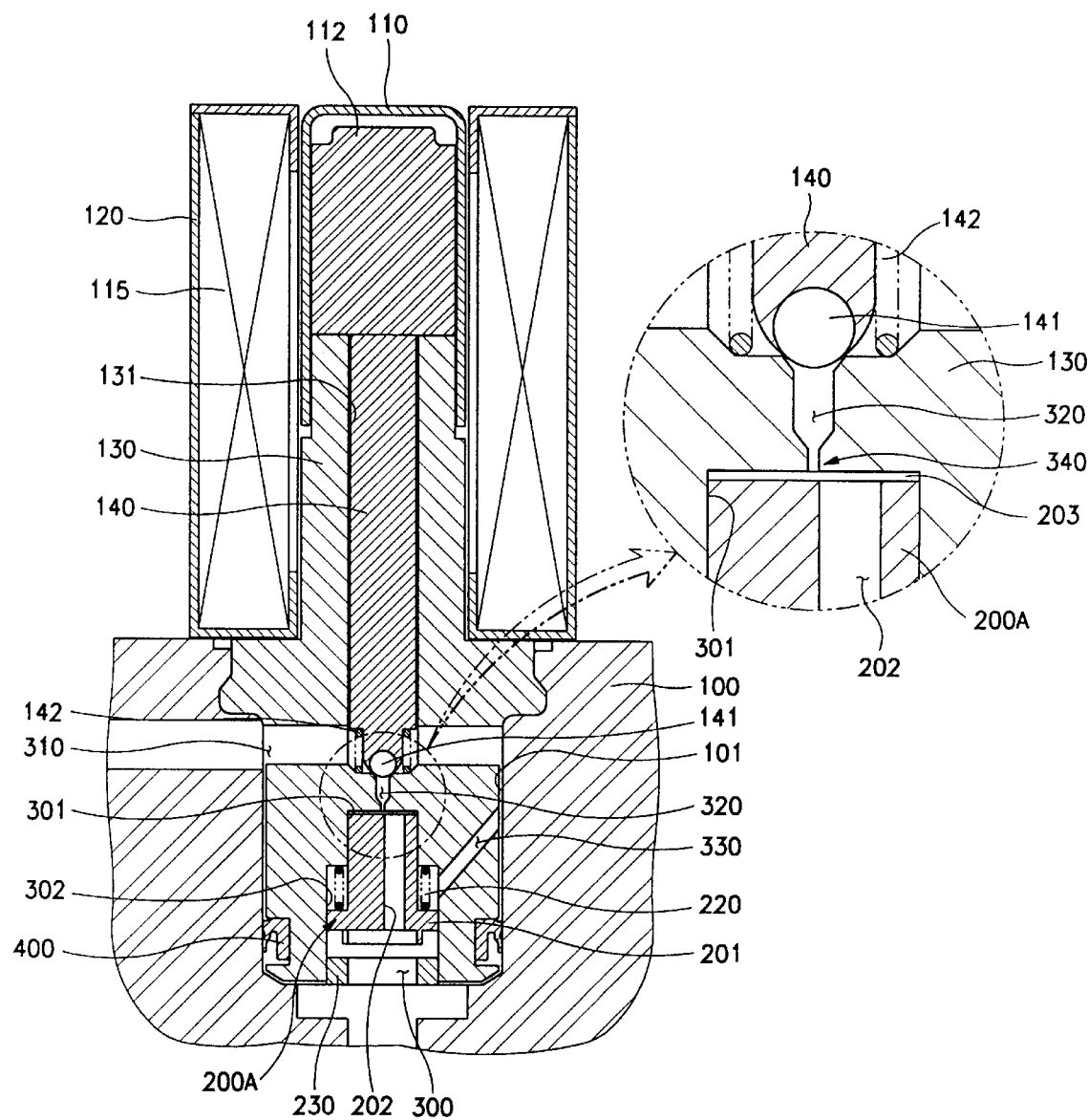
FIG. 3 is a longitudinal sectional view of the solenoid valve according to this invention, which is in the closed state to perform slip control.

If a wheel slip occurs during the normal brake mode, it is converted to the slip control mode where the brake force is reduced according to the road surface' coefficient of the friction. Thus, as shown in FIG. 3, the plunger 140 is moved down to let the ball 141 shut the upper end of the invariable orifice 320, and then the pressure difference between the inlet passage 300 and the outlet passage 310 makes the piston 200A be moved upward against the spring 220's elastic force and contact the invariable orifice 320's lower end. The oil in the large-diameter portion 302 of the inlet passage 300 flows to the outlet passage 310 via the through hole 330 and the gap between the bore 101 of the modulator 100 and the magnetic core 130. At this time, the lip seal 400 prevents the hydraulic oil in the inlet passage 300 from flowing to the outlet passage 310 through the gap between the bore 101 of the modulator 100 and the magnetic core 130.

Therefore, since the hydraulic oil from the master cylinder is not transmitted to the wheel cylinder, the brake force is not produced.

Figure 4:
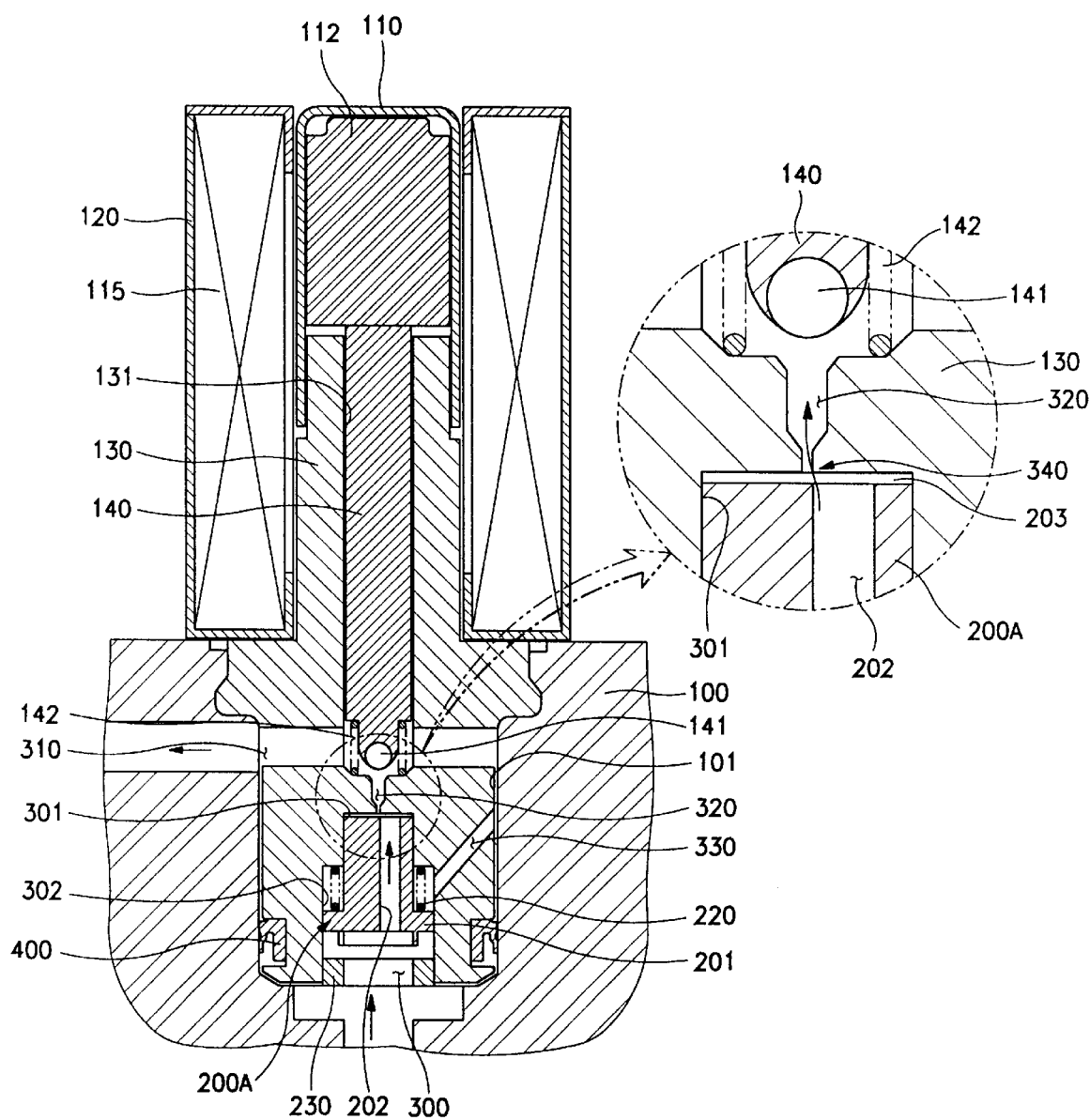
FIG. 4 is a longitudinal sectional view of the solenoid valve according to this invention, which is in a partially opened state to perform slip control.

If an increase in the brake force is required in response to the temporary increase in the coefficient of friction on the road surface in such a slip control mode, as depicted in FIG. 4, the plunger 140 is moved up while the piston 200A is stationary, thus opening the invariable orifice 320. The hydraulic oil introduced to the inlet passage 300 is reduced in pressure by passing the variable orifice 340, and transmitted to the wheel cylinder through the invariable orifice 320 and the outlet passage 310.

Accordingly, the wheel slip can be controlled by the pressure reducing action of the variable orifice 340 and the opening/closing action of the plunger 140.

In this state, if the braking pressure from the master cylinder is removed, the oil in the wheel cylinder flows to the inlet passage 300 via the outlet passage 310, the gap between the modulator 100's bore 101 and the magnetic core 130 and the lip seal 400, thus rapidly releasing the brake force.

Subsequently, as the plunger 140 is moved up and the piston 200A is moved down, the valve returns to the normal brake state, as depicted in FIG. 2.

Figure 7:
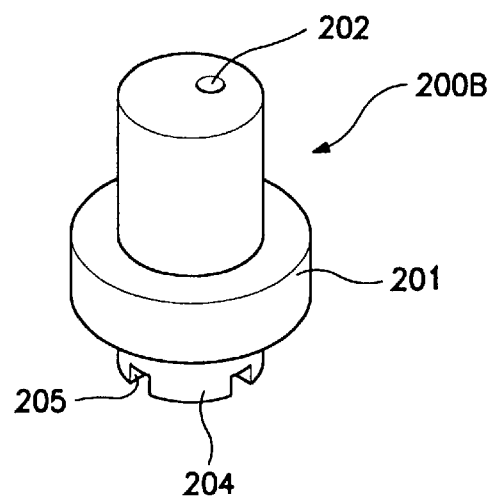
FIG. 7 is a perspective view of a piston according to a second embodiment of this invention.
Figure 8:
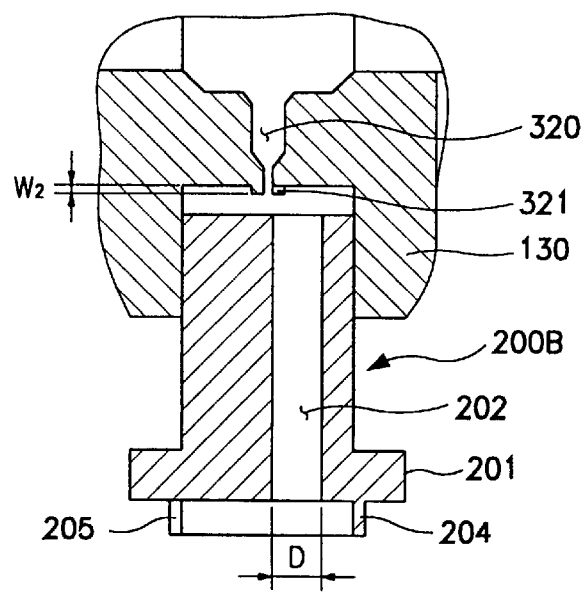
FIG. 8 is a longitudinal sectional view of the piston mounted on a magnetic core in FIG. 7.

FIGS. 7 and 8 depict a piston and an invariable orifice used in the normal-open solenoid valve in accordance with a second preferred embodiment.

As shown in FIG. 7, a piston 200B is the same structure as the piston 200A in the first preferred embodiment, except that there is no groove 203 on the top surface of the piston.

In this second preferred embodiment, as shown in FIG. 8, a protruding jaw 321 is formed extending from the invariable orifice 320's lower end, instead of the groove 203 of the first preferred embodiment.

Accordingly, as the piston 200B is moved up and contacts the invariable orifice 320's lower end, the protruding jaw 321 allows the oil to flow smoothly to the outlet passage 310 from the inlet passage 300 through the variable orifice 340 and invariable orifice 320. As depicted in FIG. 8, it is preferable that the height W2 of the protruding jaw 321 is formed to be smaller than the eccentric hole 202's diameter D.

Figure 9:
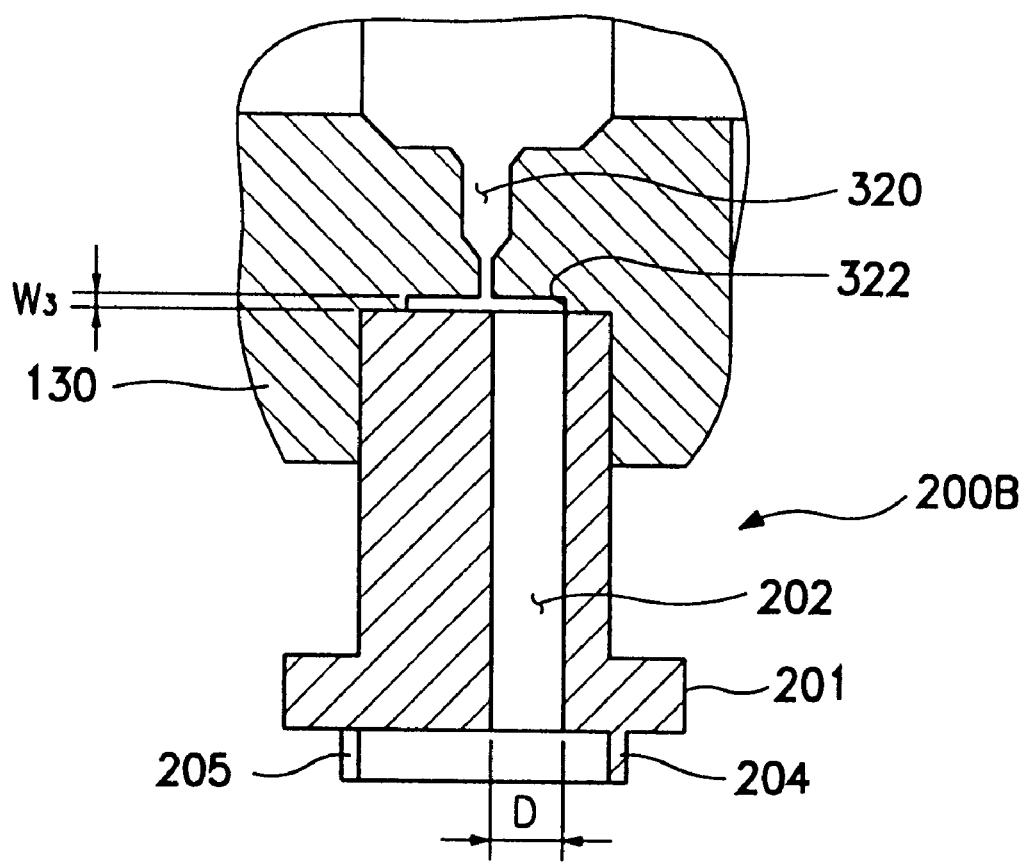
FIG. 9 is a longitudinal sectional view of a piston mounted on a magnetic core according to a third embodiment of this invention.

FIG. 9 depicts a piston and an invariable orifice used in the normal-open solenoid valve in accordance with a third preferred embodiment.

The piston in this third preferred embodiment is the same shape as the piston 200B in the second preferred embodiment. What is different from the second preferred embodiment is that the third embodiment has a small recess 322 provided to the invariable orifice 320's lower end which serves as the protruding jaw 321 provided to the lower end of the invariable orifice 320 in the second preferred embodiment.

Therefore, the operation of the variable orifice in the third preferred embodiment is the same as that of the variable orifice in each of the first and second preferred embodiments. It is preferable that the depth W3 of this recess 322 is smaller than the eccentric hole 200's diameter D.

As described above, since the normal-open solenoid valve of this invention includes the variable orifice that can reduce the pressure of the oil along with the invariable orifice, the brake force can be easily regulated and the wheel slip can be precisely controlled, thus enhancing the product reliability.

This dual orifice structure prevents an abrupt variation of the pressure in the oil passages so that water hammering phenomenon is not produced. Accordingly, this invention can reduce the noise that may occur during operation and avoid damage to components due to the water hammering phenomenon.

In addition, in the normal-open solenoid valve of this invention the oil passages and orifices are formed in the magnetic core and the piston is also mounted in the magnetic core, thereby simplifying the structure and facilitating the manufacture.

What is claimed is:

1. A solenoid valve for an anti-lock brake system having a modulator comprising:

a magnetic core inserted into a bore provided to said modulator, and having a plunger hole formed extending from its upper end to its middle, an inlet passage provided to its middle from its lower end, an outlet passage provided at the lower end of said plunger hole, and an invariable orifice allowing said inlet passage to communicate with said outlet passage;

a plunger installed in said plunger hole in such a manner that it is movable up and down, and having a ball on its lower end for opening and closing an upper end of said invariable orifice; and a piston provided to said inlet passage in such a manner that it is movable up and down, and having an eccentric hole formed vertically passing through its interior, thus forming a variable orifice along with a lower end of said invariable orifice.

2. The solenoid valve according to claim 1, wherein said inlet passage has a small-diameter portion and a large-diameter portion on its upper and lower areas, respectively, and the piston is of a diameter of a nearly same size as said small-diameter portion, and has a support jaw having a nearly same diameter as said large-diameter portion on its lower end, and a spring is provided between the upper end of said large-diameter portion and said support jaw to urge said piston downward.

3. The solenoid valve according to claim 2, wherein said piston has a groove on its top surface to allow said eccentric hole to communicate with said invariable orifice.

4. The solenoid valve according to claim 3, wherein said groove has a width (W1) smaller than a diameter (D) of said eccentric hole.

5. The solenoid valve according to claim 2, wherein a protruding jaw is provided to the lower end of said invariable orifice to allow said eccentric hole to communicate with said invariable orifice.

6. The solenoid valve according to claim 5, wherein said protruding jaw has a height (W2) smaller than the diameter (D) of said eccentric hole.

7. The solenoid valve according to claim 2, wherein a recess is provided to the lower end of said invariable orifice to allow said eccentric hole to communicate with said invariable orifice.

8. The solenoid valve according to claim 7, wherein said recess has a width (W3) smaller than the diameter (D) of said eccentric hole.

9. The solenoid valve according to claim 2, wherein an extending part is provided to the bottom of said support jaw, which has a diameter smaller than the diameter of said support jaw, a plurality of slots being formed at its side surface.

10. The solenoid valve according to claim 9, wherein a ring-shaped stopper is provided to the lower end of said inlet passage to restrict the downward movement of said piston.

11. The solenoid valve according to claim 2, wherein said magnetic core has a through hole formed slanting upward to its one side from the large-diameter portion of said inlet passage.

12. The solenoid valve according to claim 11, wherein a lip seal is formed between the outer periphery of said magnetic core and the bore of said modulator to prevent oil from flowing to the direction of said outlet passage.

* * * * *